US011655838B2

(12) United States Patent
Hollenbeck (10) Patent No.: US 11,655,838 B2
(45) Date of Patent: May 23, 2023

(54) MATERIAL MECHANICAL FASTENER (71) Applicant: Chad Hollenbeck, Berkshire, NY (US)

(72) Inventor: Chad Hollenbeck, Berkshire, NY (US)

(*) Notice: Subject to any disclaimer, the term of this patent is extended or adjusted under 35 U.S.C. 154(b) by 0 days.

(21) Appl. No.: 17/725,987

(22) Filed: Apr. 21, 2022

(65) Prior Publication Data
US 2022/0349434 A1 Nov. 3, 2022

Related U.S. Application Data (60) Provisional application No. 63/201,525, filed on May 3, 2021.

(51) Int. Cl.
F16B 15/02 (2006.01)
(52) U.S. Cl.
CPC .................... F16B 15/02 (2013.01)
(58) Field of Classification Search
CPC ........ F16B 15/00; F16B 19/14; F16B 13/126; F16B 15/02
USPC ................................. 411/487, 493
See application file for complete search history.

(56) References Cited

U.S. PATENT DOCUMENTS

| 4,275,637 A * | 6/1981 | Herb ................... F16B 13/0816 411/72 |
| 4,454,701 A * | 6/1984 | Walter ................. F16B 13/08 52/704 |
| 4,679,975 A | 7/1987 | Leistner |
| 5,011,354 A | 4/1991 | Brownlee |
| 5,154,670 A | 10/1992 | Sygnator et al. |
| 5,700,119 A * | 12/1997 | Wakai ..................... F16B 15/04 411/79 |
| 7,374,383 B2 | 5/2008 | Crompton et al. |
| 2004/0136811 A1* | 7/2004 | Tarlton ................... F16B 15/00 411/451.4 |
| 2004/0173483 A1* | 9/2004 | Sutt, Jr. ............. B65D 19/0095 206/338 |
| 2006/0067805 A1 | 3/2006 | Reed |
| 2013/0039719 A1* | 2/2013 | Katz ....................... F16B 15/00 411/455 |
| 2015/0071734 A1 | 3/2015 | Vallejo |

FOREIGN PATENT DOCUMENTS

CZ 306834 B6 7/2012

* cited by examiner

Primary Examiner — Sarang Afzali
Assistant Examiner — Darrell C Ford
(74) Attorney, Agent, or Firm — Hudak, Shunk & Farine Co. LPA (57) ABSTRACT A fastener suitable for temporarily or permanently connecting one object to another, for example a form to concrete. The fastener includes a nail having a guide wire bonded thereto, with the guide wire including a segment that extends outwardly past the tip of the nail, which facilitates insertion into a hole predrilled in the objects. The bond between the nail and wire is adapted to be broken in at least one area of connection when the fastener is driven into the predrilled hole.

16 Claims, 7 Drawing Sheets

MATERIAL MECHANICAL FASTENER

FIELD OF THE INVENTION

The present invention relates to a fastener suitable for temporarily or permanently connecting one object to another, for example a former such as a concrete form or wood construction, to concrete. The fastener includes a nail having a guide wire bonded thereto, with the guide wire including a segment that extends outwardly past the tip of the nail, which facilitates insertion into a hole predrilled in the objects. The bond between the nail and wire is adapted to be broken in at least one area of connection when the fastener is driven into the predrilled hole.

BACKGROUND OF THE INVENTION

Many different construction materials have been developed to connect one object to another, for example a wood or plastic form to a concrete structure, at least temporarily.

One prior art technique {or method} used in the construction industry to temporarily secure an article to concrete utilizes a wire, for example made of metal or plastic which is inserted into a predrilled hole in the article and concrete, along with a nail, whereupon driving the nail with the wire located between one portion of the nail and a wall of the hole is used to retain the nail within the hole thereby connecting the article and the concrete. The nail and wire can each be removed from the hole in a reverse process when the anchoring function is no longer needed, see for example FIGS. 1-3 and paragraph [0030] of U.S. Publication No. 2006/0067805.

U.S. Publication No. 2006/007805 relates to a nail for temporarily securing articles to a concrete structure includes a double-head and an elongated shank with a lower end crimped on opposite sides to establish offset undulating profiles. The nail is driven into a hole in the concrete, with conventional nail installation tools, to establish a snug yet relatively light interference fit. The nail is removed from the concrete, with conventional clawed nail removal tools, when the need for the temporary installation is complete.

U.S. Publication No. 2015/0071734 relates to a concrete fastener with ribs attached to the body that, when driven into a pre-drilled hole, the ribs reportedly collapse due to the friction between the concrete/CMU and the fastener ribs creating a temporary or permanent attachment between the objects.

U.S. Pat. No. 5,011,354 relates to a fastener for use particularly to temporarily secure wood strip members to a concrete substrate that includes an upper cylindrical head overlying a first cylindrical shank, with a truncated conical further head coaxially aligned with the cylindrical head, with a second shank positioned between the further head and an elliptical, deformable anchor portion including a third shank underlying the anchor portion. The anchor portion is deformable to enhance securement of the fastener within the concrete substrate, and wherein further the cylindrical head and the further head define a gap therebetween to enable removal of the fastener by application of a tool to the first shank.

SUMMARY OF THE INVENTION

It would be desirable in view of the above, to have a concrete and/or other hard substrate construction fastener that is easy to install and save time for a construction worker. Furthermore, it would be desirable to have a fastener that is cost efficient. Still further, it would be desirable to have a fastener that is able to be used in multiple applications which would make employees more efficient and contractors would not be required to buy multiple types of fasteners or other products for different substrates. Therefore, a need currently exists in the industry for a fastener that saves time, money and enhances efficiency.

The present invention solves the problems noted above and others by providing a fastener for connecting, temporarily or permanently, an object, such as a wood or plastic form to a second object such as concrete or other hard substrate.

The term "nail" as utilized herein encompasses any mechanical fastener that can be utilized to secure one object to another and includes, but is not limited to, a nail, pin, tack, hit pin, spike, coil and screw.

The term "guide wire" as used herein is a deformable material having a Rockwell hardness that is less than the hardness of the nail as measured according to ASTM-E18-20. Guide wires include, but are not limited to, wires, threads, lines, strands, cables and the like. Guide wires may be formed of any suitable material so long as it accomplishes the intended function thereof and can be for example metal, plastic, composite materials and the like.

The bonding agent utilized to bond the nail to the guide wire is not particularly limited to any particular composition and can be for example solder, tape, adhesive or the like.

In one aspect a fastener for temporarily or permanently connecting objects to each other is disclosed, comprising a nail comprising a shaft having a longitudinal axis, a head at a first end of the shaft that is wider than the shaft and a tip at a second end of the shaft; and, a guide wire bonded to the nail in at least one location along the shaft, wherein the guide wire has a longitudinal length that extends a distance past the tip of the nail, wherein the bond between the nail and wire is adapted to be broken when the fastener is driven into a predrilled surface in the objects.

In one embodiment, the guide wire extends out past the tip a distance of at least 20% of the length of the nail, measured along the longitudinal axis.

In a further embodiment, the guide wire has a hardness less than the Rockwell hardness of the nail as measured according to ASTM-E18-20.

In still another embodiment, the guide wire is cylindrical, wherein the shaft is cylindrical, and wherein the guide wire has a diameter that is less than 48% of a diameter of the shaft.

In one embodiment, the head extends outwardly in a direction perpendicular to the longitudinal axis a distance greater than the guide wire, measured at one location where the guide wire is bonded to the shaft.

In a further embodiment, the bonding agent bonds the guide wire to the nail, wherein the bonding agent is one or more of solder, glue, tape, adhesive or welding agent.

In still another embodiment, the nail head is a duplex head.

In one embodiment, the guide wire runs parallel with the shaft along the length of the shaft.

In a further embodiment, the guide wire extends out past the tip a distance of at least 25% of the length of the nail, measured along the longitudinal axis.

In still another embodiment, the guide wire is cylindrical, wherein the shaft is cylindrical, and wherein the guide wire has a diameter that is less than 37% of a diameter of the shaft.

In one embodiment, the bond between the guide wire and the nail is formed by one or more of a) a connection of the guide wire to the nail without the bonding agent and a b) tie.

In a further embodiment, the guide wire comprises a loop formed at one end of the guide wire, wherein the loop bonds the guide wire to the nail.

In still another embodiment, the loop is disposed adjacent the head at the first end of the shaft.

In one embodiment, the tie is one or more of a clip, band and washer.

In a further embodiment, the tie extends around the outside of both the guide wire and the nail to form the bond therebetween.

In a further aspect, a method for temporarily or permanently fastening an object to concrete with the fastener is disclosed comprising the steps of obtaining the fastener; drilling a hole through the object and into the concrete, wherein the hole is sized to establish an interference fit with the fastener; inserting the fastener into the hole with the guide wire enters the hole first; and driving the fastener into the hole and securing the object to the concrete as the fastener is driven into the hole.

In one embodiment, the guide wire is separated from the nail during the driving step.

In a further embodiment, the step of removing the fastener from the hole thereby leaving the guide wire within the hole.

In still another embodiment, the object is a piece of wood, metal or plastic.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "upper", "down," "lower", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Referring now to the drawings, wherein like parts are represented by like reference numbers throughout the several views, a fastener 10 is illustrated in FIGS. 1-6 including a nail 20, guide wire 30 and a bonding agent 40 which bonds, at least temporarily, the guide wire to the nail.

Figure 1:
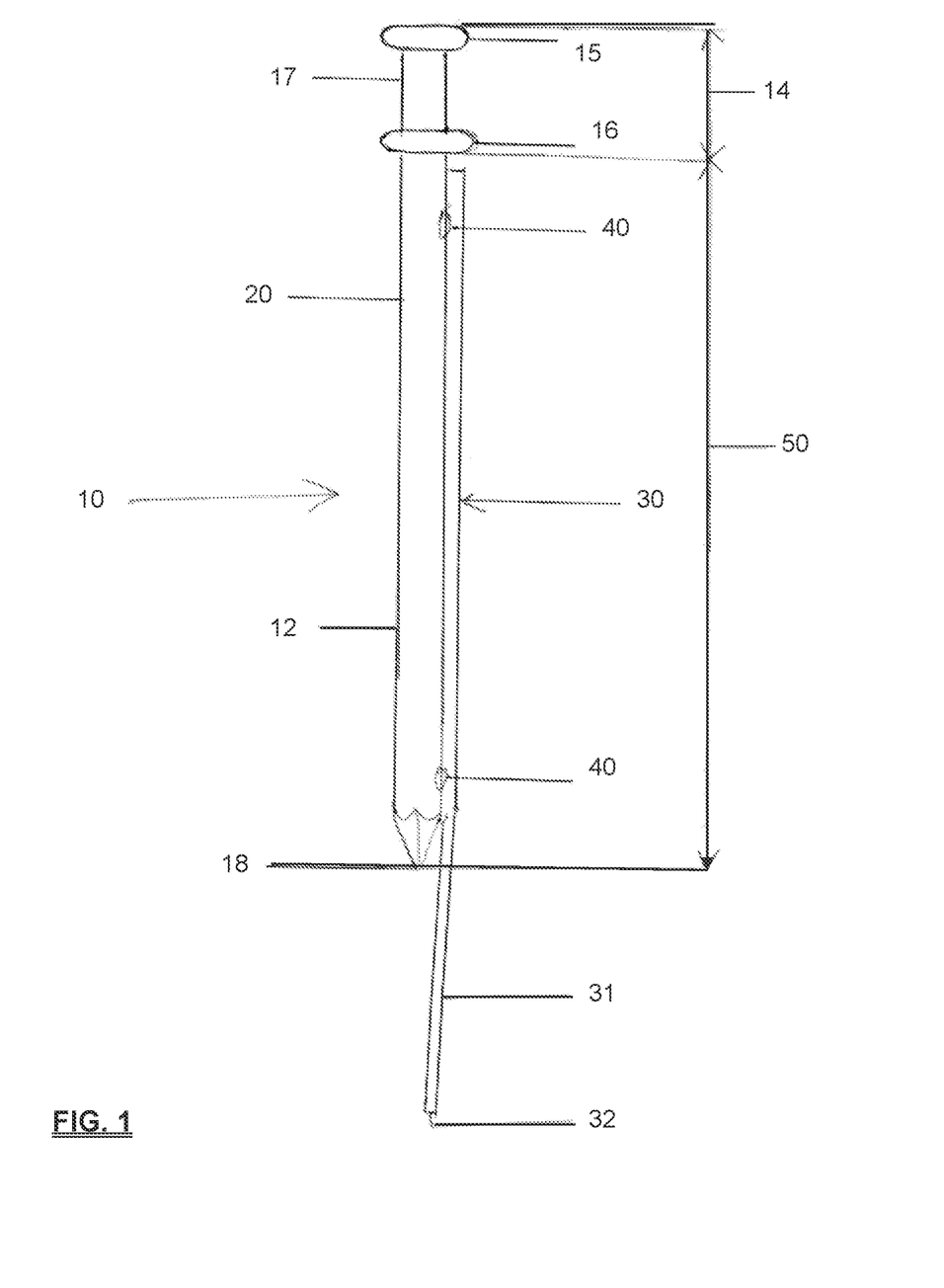
FIG. 1 is a side view of one embodiment of a fastener of the present invention.
Figure 2:
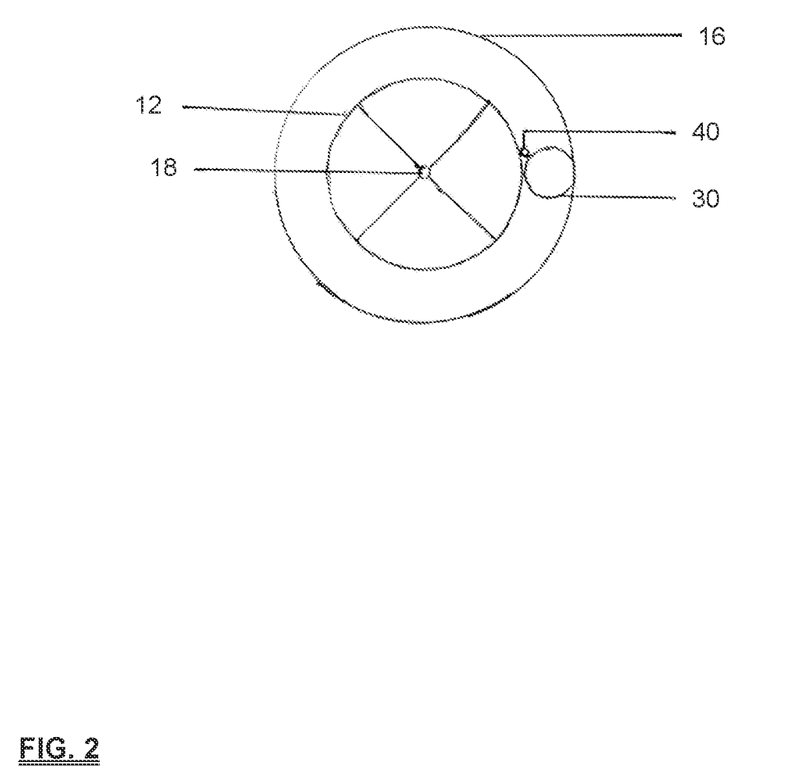
FIG. 2 is a bottom view of the embodiment illustrated in FIG. 1.
Figure 3:
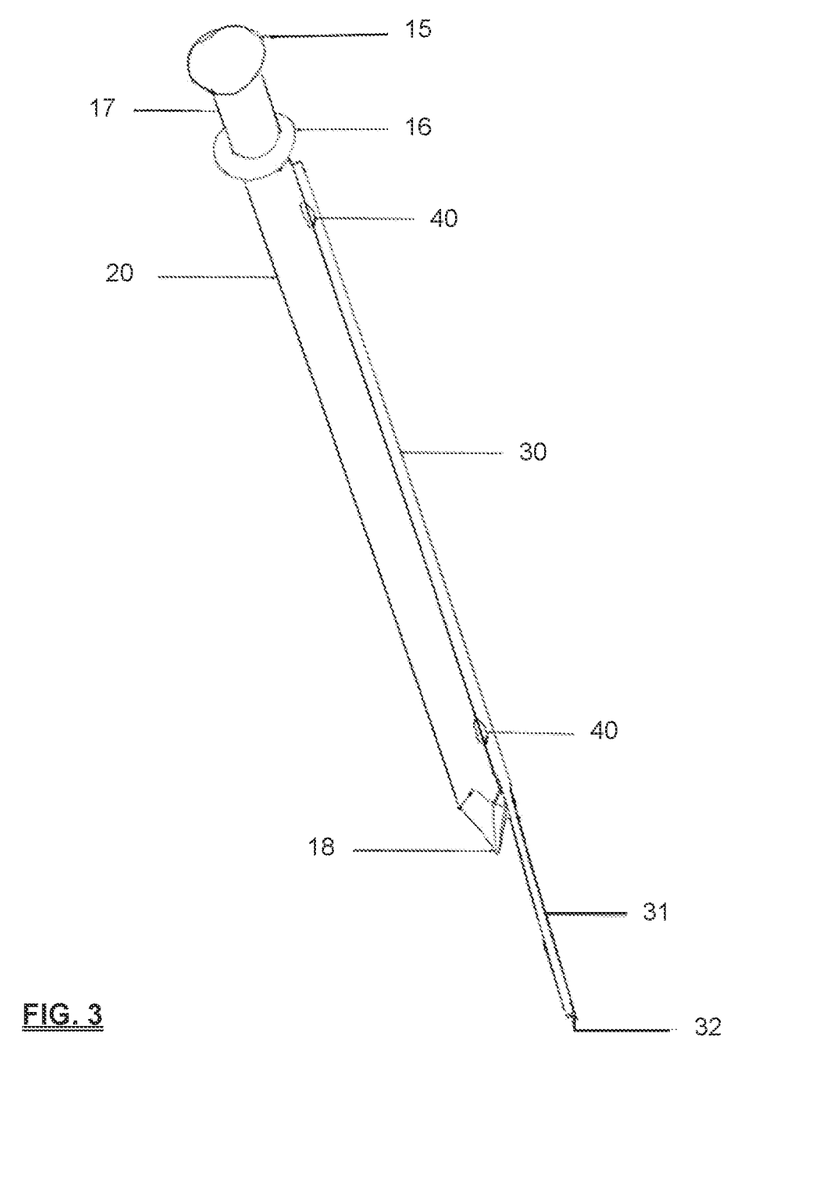
FIG. 3 is a perspective view of the embodiment illustrated in FIG. 1.
Figure 4:
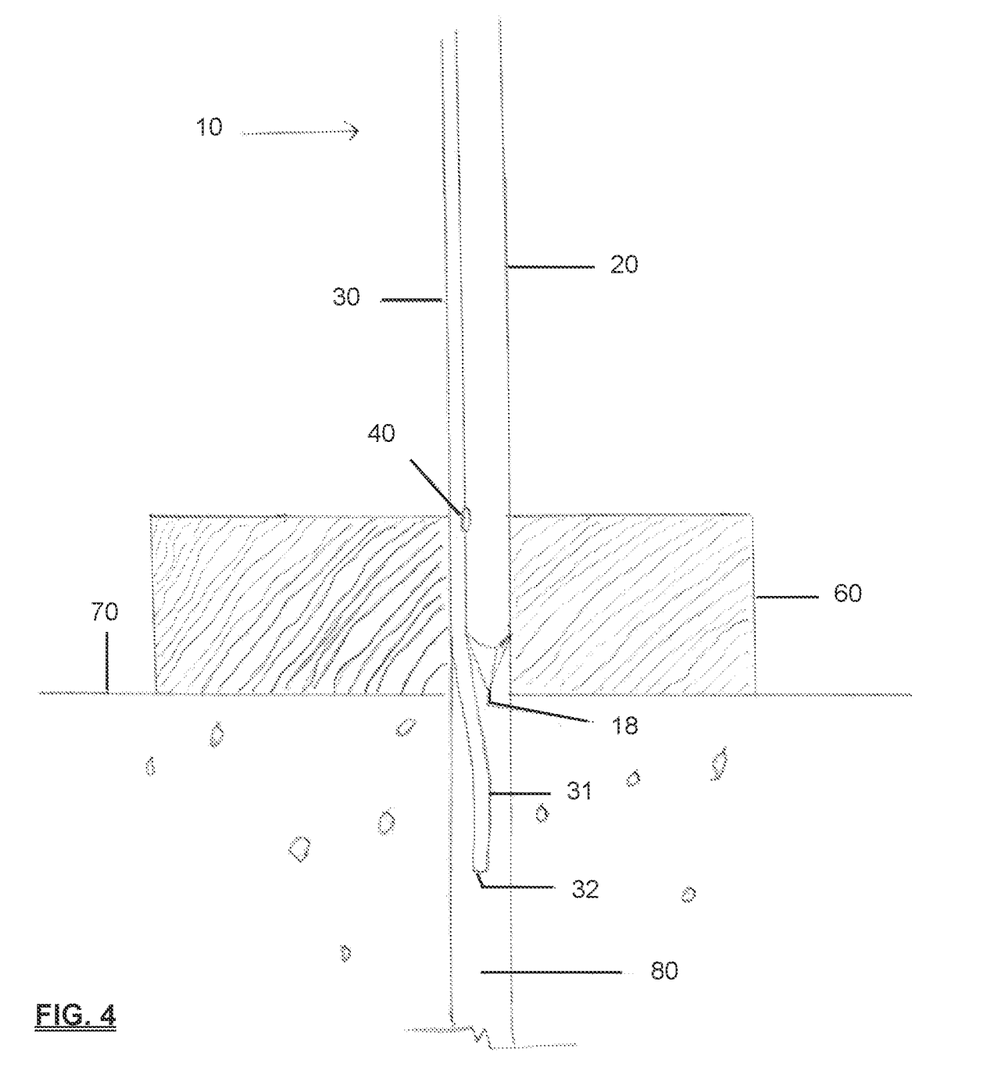
FIG. 4 is a cross-sectional view illustrating the fastener in the process of being inserted into an aperture pre-drilled in a piece of wood and concrete.
Figure 5:
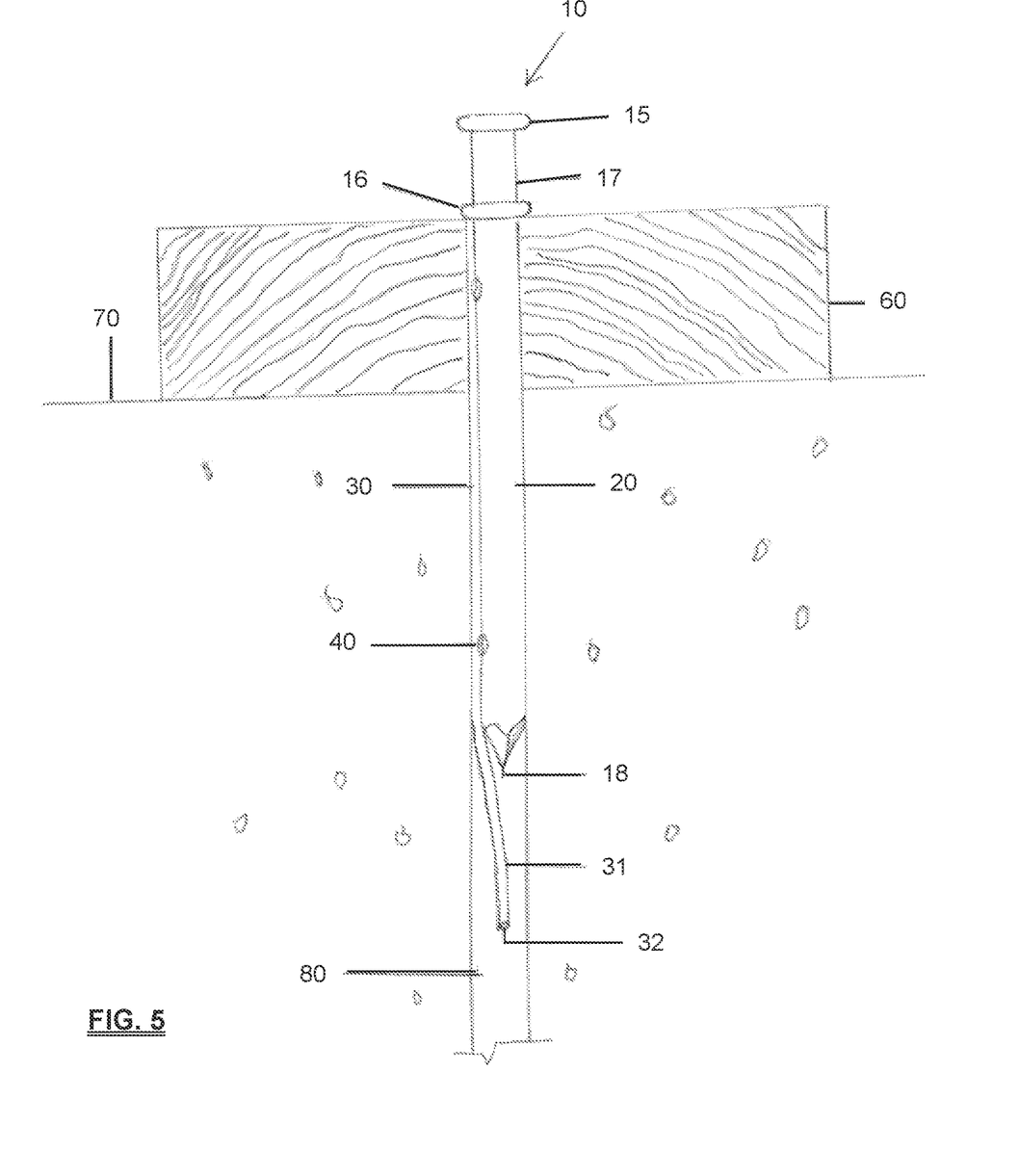
FIG. 5 is a cross-sectional view illustrating the fastener driven into the pre-drilled aperture up to the lower head of the fastener.
Figure 6:
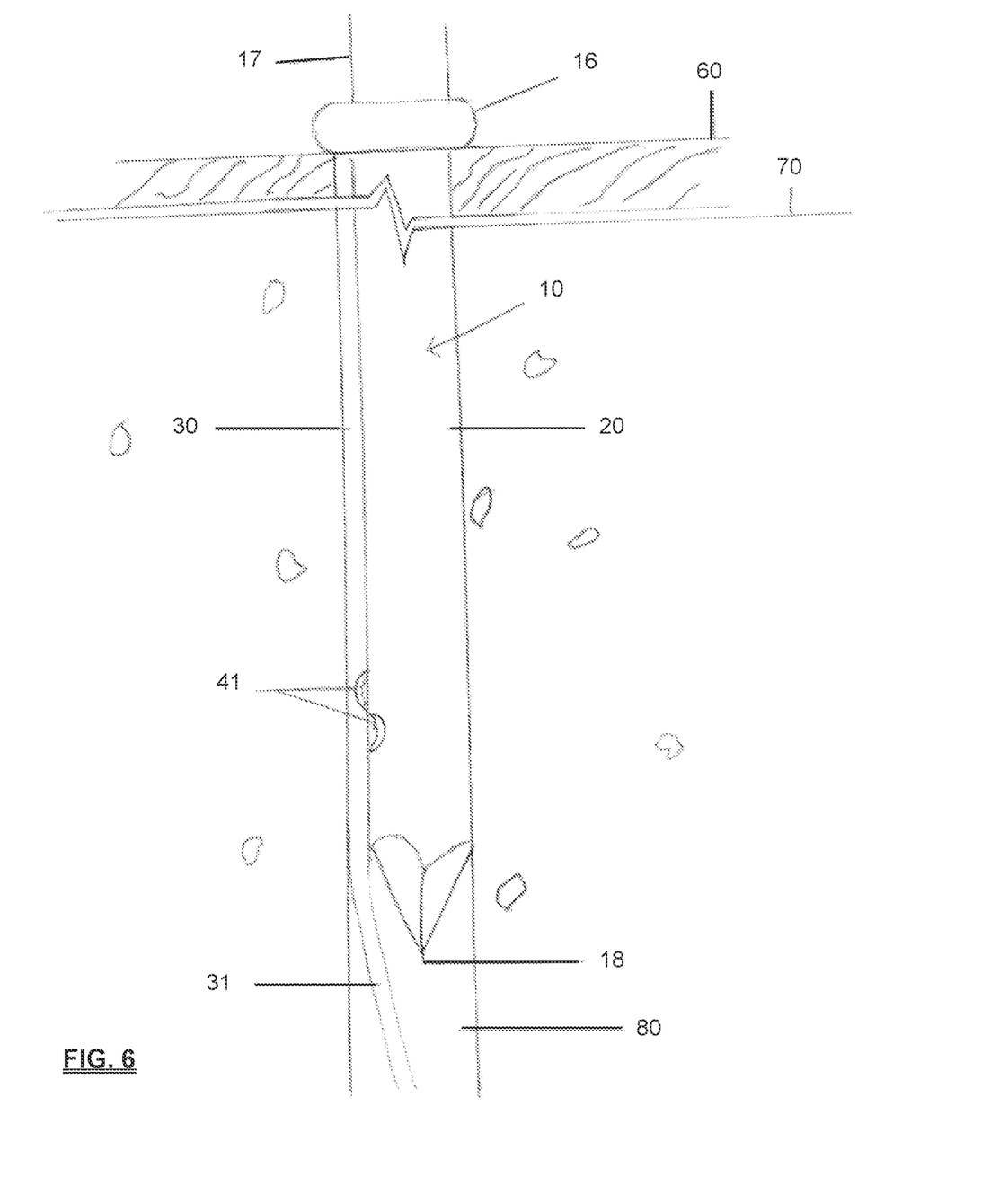
FIG. 6 is a partial cross-sectional view of FIG. 5 showing the bond between the nail and the wire of the fastener being broken in at least one area of connection.

The nail comprises a shank or shaft 12 having a longitudinal axis 50. Located at a first end of the shaft is a head 14 that is wider than the shaft, measured in a direction perpendicular to the longitudinal axis 50. In the embodiment illustrated, head 14 is a duplex head having an upper head 15 and a lower head 16 with a narrower midsection 17 extending therebetween. The use of a duplex head is preferred when the fastener is used to temporarily connect two materials. The fastener is preferably driven into the objects such that lower head 16 is located adjacent an outer surface of the first object into which the fastener has been driven, for example as shown in FIGS. 5 and 6. A narrower midsection 17 between upper head 15 and a lower head 16 allows for extraction of the fastener utilizing a claw of a hammer or tool. Thus, use of the duplex head allows part of the nail to protrude above the object for extraction.

Nail 20 also includes tip 18 which is at a second end of shaft 12. Tip 18 is preferably pointed, but may be blunt, rounded or any other shape if desired. Shaft 12 and a narrower midsection 17 are preferably circular in cross-section, perpendicular to the longitudinal axis 50 of the nail. The size or diameter of the shaft 12 can vary depending upon considerations such as size of the objects to be joined and size of the hole drilled in the objects, for example.

The nail is preferably formed from metal. In some embodiments, the nail is a 16d duplex head bright finish nail.

Guide wire 30 bonded to nail 20 has a longitudinal length measured along longitudinal axis 50. In a preferred embodiment, the portion of guide wire 30 coextensive with shaft 12 is parallel thereto.

In an important aspect of the invention, the guide wire 30 has a guide segment 31 that extends outwardly past the tip 18 of nail 20. Guide segment 31 acts as a guide for the nail and a tip 32 first enters a predrilled hole in the objects prior to nail 20. If the guide wire does not enter the hole first, the wire can hit the side of the hole prior to entering and bend, ball up or potentially not even enter the hole as the fastener is driven into the hole. In various embodiments, the guide wire extends past the tip a distance of generally at least 20%, desirably at least 25% and preferably at least 28% of the length of the nail measured along the longitudinal axis.

The guide wire has a Rockwell hardness less than the hardness of the nail as measured according to ASTM-E18-20. The relatively low hardness of the guide wire allows the guide wire to deform between a sidewall of the hole into which the fastener is placed and the nail. The deformability of the guide wire aids in establishing an interference fit between the nail and wall of the hole.

In a preferred embodiment, the guide wire is cylindrical. The guide wire in some embodiments has a diameter that is generally less than 48%, preferably 37% and no less than 30% of a diameter of the shaft 12 of the nail.

In one preferred embodiment the guide wire is a 16 gauge, black and annealed, steel tie wire.

In one embodiment, tip 32 of guide wire 30 is positioned substantially directly below tip 18 of nail 20. This facilitates ease of positioning of the fastener in a hole in the objects into which the fastener is to be driven.

While the guide wire is preferably metal, it is to be understood that non-metallic materials, such as polymers may be used as well, for example as described hereinabove.

As illustrated in various figures, bonding agent 40 bonds guide wire 30 to nail 20. Any suitable material can be utilized so long as it functions to provide the desired bond. In one embodiment, the bonding agent is one or more of solder, glue, tape, adhesive and welding agent.

Bonding agent can be applied to either or both of the nail 20 and guide wire 30 to facilitate bonding therebetween. The bonding agent can be located at one or more locations between the nail and the guide wire.

In a highly preferred embodiment the bond between the nail 20 and guide wire 30 is able to be broken after the fastener is driven into a hole. The breakability of the bond allows the fastener to be easily extracted after completion of a job and connection is no longer needed between two objects, for example the form and concrete. After being driven into the hole, the wire is all one piece and remains that way as does the nail. The wire may deform in some embodiments.

As the wire enters the hole it is small enough to guide the fastener into the larger drilled hole. As the nail and wire are driven through the material being fastened, the friction of the fastener to the material is not enough to break the bond. But as at the point when the wire and the nail begin to enter the hole in the concrete, the bond between the wire and the nail will have enough friction to begin breaking that bond. Both will be driven into the hole for a distance until the bond is completely broken between the nail and the wire. The broken bond is illustrated using reference number 41. Thus, the bond is broken in at least one area, such as shown in FIG. 6 when the fastener is driven into the hole. Once the bond is fully broken, the wire and the nail remain whole objects themselves. Upon removal of the fastener the nail will come out of the hole and the wire remains in the hole until physically removed separately.

Figure 7:
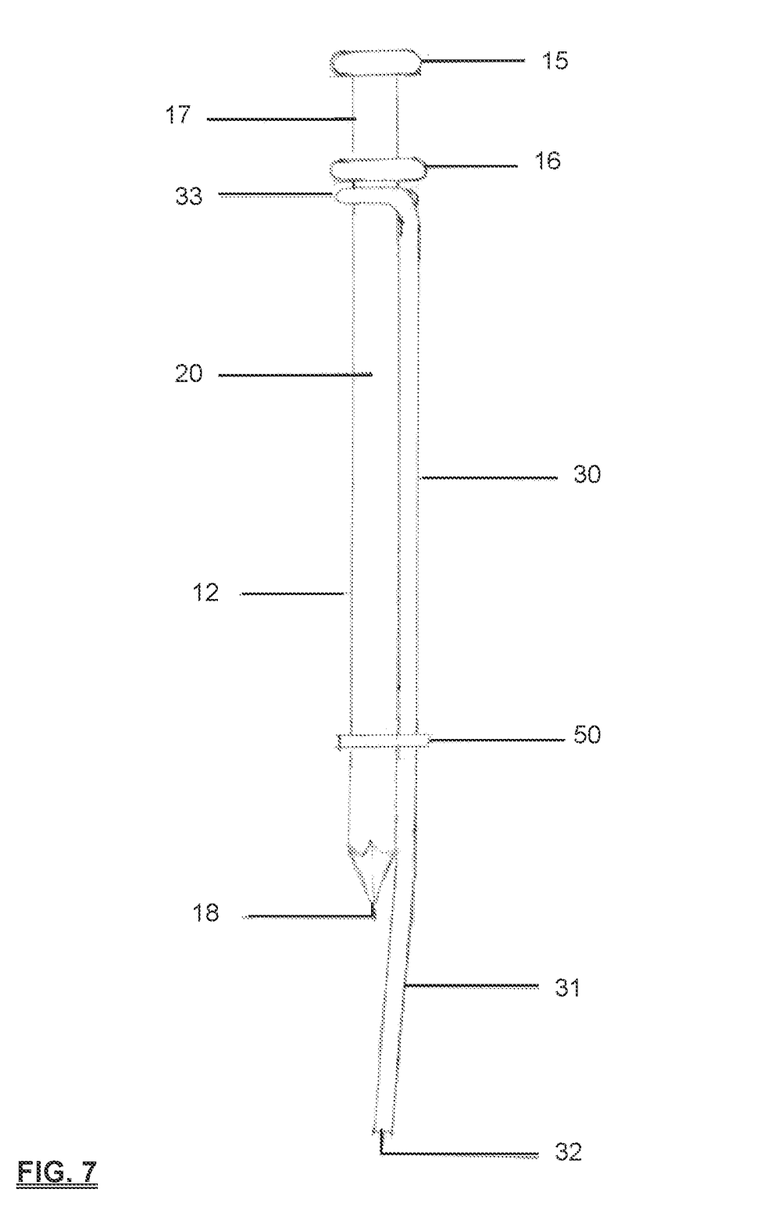
FIG. 7 is a side view illustrating a guide wire bonded to the nail through use of a loop formed in the guide wire at one end thereof and a tie that holds the guide wire adjacent to the shaft of the nail at a location near the tip of the nail.

In a further embodiment, the bond between nail 20 and wire guide 30 is formed by one or more of a) a connection of the guide wire 30 to the nail 20 without the bonding agent and a b) tie. FIG. 7 illustrates an embodiment where guide wire 30 is bonded to nail 20 utilizing both alternatives to a bonding agent. As the guide wire 30 has a relatively low hardness, the flexibility thereof is utilized to form a loop 33 at the upper end of guide wire 30 in order to connect the guide wire to the nail prior to use. Loop 43 is formed at an upper end of the guide wire by any suitable means. The loop 33 can be formed prior to contact with the nail whereby the loop can be slid inserted over tip 18 up the shaft of the nail and situated below the lower head 16, such as illustrated in FIG. 7. The loop 30 can be more or less than one complete loop so long as the loop serves to bind the guide wire to the nail.

Tie 50 can be formed as a washer, clip, band or the like which extends around both nail 20 and guide wire 30 in order to bond or secure the two together prior to use. In one embodiment, in order to install the tie 50 around nail 20 and guide wire 30, the tip 32 is inserted into an aperture within the tie 50, followed by tip 18 of nail 20. The washer is placed at a desired location along shaft 12. For the sake of clarity, it should be noted that multiple ties 50 can be utilized to at least temporarily bond nail 20 to guide wire 30.

For the avoidance of doubt, the devices and methods of the present invention encompass all possible combinations of the components, including various ranges of said components, disclosed herein. It is further noted that the term 'comprising' does not exclude the presence of other elements. However, it is also to be understood that a description of a product comprising certain components also discloses a product consisting of these components. Similarly, it is also to be understood that a description on a process comprising certain steps also discloses a process consisting of these steps.

In accordance with the patent statutes, the best mode and preferred embodiment have been set forth; the scope of the invention is not limited thereto, but rather by the scope of the attached claims.

What is claimed is:

1. A fastener for temporarily or permanently connecting objects to each other, the fastener comprising:
   a nail comprising a shaft having a longitudinal axis, a head at a first end of the shaft that is wider than the shaft and a tip at a second end of the shaft; and,
   a guide wire bonded to the nail in at least one location along the shaft, wherein the guide wire has a longitudinal length that extends a distance past the tip of the nail, wherein a bonding agent bonds the guide wire to the nail, wherein the bonding agent is one of more of solder, glue, adhesive and welding agent,
   wherein the bond between the nail and the guide wire is adapted to be broken when the fastener is driven into a predrilled surface in the objects, whereby the nail and the guide wire independently remain whole.

2. The fastener according to claim 1, wherein guide wire extends out past the tip a distance of at least 20% of the length of the nail, measured along the longitudinal axis.

3. The fastener according to claim 1, wherein the guide wire has a hardness less than the Rockwell hardness of the nail as measured according to ASTM-E18-20.

4. The fastener according to claim 1, wherein the guide wire is cylindrical, wherein the shaft is cylindrical, and wherein the guide wire has a diameter that is less than 48% of a diameter of the shaft.

5. The fastener according to claim 1, wherein the head extends outwardly in a direction perpendicular to the longitudinal axis a distance greater than the guide wire, measured at one location where the guide wire is bonded to the shaft.

6. The fastener according to claim 1, wherein the nail head is a duplex head.

7. The fastener according to claim 1, wherein the guide wire runs parallel with the shaft along the length of the shaft.

8. The fastener according to claim 7, wherein guide wire extends out past the tip a distance of at least 25% of the length of the nail, measured along the longitudinal axis.

9. The fastener according to claim 8, wherein the guide wire is cylindrical, wherein the shaft is cylindrical, and wherein the guide wire has a diameter that is less than 37% of a diameter of the shaft.

10. A fastener for temporarily or permanently connecting objects to each other, the fastener comprising:
- a nail comprising a shaft having a longitudinal axis, a head at a first end of the shaft that is wider than the shaft, and a tip at a second end of the shaft; and
- a guide wire bonded to the nail in at least two locations along the shaft, wherein the guide wire has a longitudinal length that extends a distance past the tip of the nail,
- wherein the bond between the guide wire and the nail is formed a) a tie and b) a connection of the guide wire to the nail without a bonding agent,
- wherein the guide wire comprises a loop formed at one end of the guide wire, wherein the loop bonds the guide wire to the nail, forming the connection of the guide wire to the nail without a bonding agent,
- wherein the loop is disposed adjacent the head at the first end of the shaft, and
- wherein the tie is located closer to the second end of the shaft as compared to the loop.

11. The fastener according to claim 10, wherein the tie is one or more of a clip, band and washer.

12. The fastener according to claim 11, wherein the tie extends around the outside of both the guide wire and the nail to form the bond therebetween.

13. A method for temporarily or permanently fastening an object to concrete with the fastener according to claim 1, comprising the steps of:
- obtaining the fastener according to claim 1;
- drilling a hole through the object and into the concrete, wherein the hole is sized to establish an interference fit with the fastener;
- inserting the fastener into the hole with the guide wire entering the hole first;
- driving the fastener into the hole and securing the object to the concrete as the fastener is driven into the hole.

14. The method according to claim 13, wherein at least a portion of the guide wire is separated from the nail during the driving step.

15. The method according to claim 14, further including the step of removing the fastener from the hole thereby leaving a portion of the guide wire within the hole.

16. The method according to claim 15, wherein the object is a piece of wood, metal or plastic.

\* \* \* \* \*